United States Patent
Wang et al.

(10) Patent No.: US 8,925,900 B2
(45) Date of Patent: Jan. 6, 2015

(54) METHOD FOR ARRANGING A PLURALITY OF WIRES IN PIPE

(71) Applicants: Chi-Chih Wang, New Taipei (TW); Bing-Yu He, Shenzhen (CN); Tzu-Te Wang, New Taipei (TW); Po-Wei Hung, New Taipei (TW); Yao-Feng Li, Shenzhen (CN); Zhi-Qiang Wang, Shenzhen (CN)

(72) Inventors: Chi-Chih Wang, New Taipei (TW); Bing-Yu He, Shenzhen (CN); Tzu-Te Wang, New Taipei (TW); Po-Wei Hung, New Taipei (TW); Yao-Feng Li, Shenzhen (CN); Zhi-Qiang Wang, Shenzhen (CN)

(73) Assignees: GDS Software (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 207 days.

(21) Appl. No.: 13/661,134

(22) Filed: Oct. 26, 2012

(65) Prior Publication Data

US 2013/0313494 A1    Nov. 28, 2013

(30) Foreign Application Priority Data

May 24, 2012  (CN) .......................... 2012 1 0163060

(51) Int. Cl.
  *H02G 1/08* (2006.01)
  *F16L 55/00* (2006.01)

(52) U.S. Cl.
  USPC .................. 254/134.3 FT; 138/104; 138/108

(58) Field of Classification Search
  CPC ..................................................... H02G 1/083
  USPC .......... 138/104, 108; 254/21, 19, 18, 28, 120, 254/134.3 FT, 134.4; 269/3, 6, 95, 71; 29/244–282
  See application file for complete search history.

(56) References Cited

U.S. PATENT DOCUMENTS 7,857,008 B2 * 12/2010 Chen ............................. 138/109

* cited by examiner

*Primary Examiner* — Lee D Wilson
*Assistant Examiner* — Nirvana Deonauth
(74) *Attorney, Agent, or Firm* — Novak Druce Connolly Bove + Quigg LLP

(57) ABSTRACT

In a method for arranging a plurality of wires in a pipe, length of a each wire is determined in accordance with locations a plurality of holes on a surface of the pipe, and each of the plurality of wires on a lead stick is fastened in accordance with the locations of the plurality of holes on the surface of the pipe. Ends of the wires are perpendicularly connected to the surface of the lead stick. The lead stick are inserted into the pipe, and the ends of the plurality of wires are extended from the plurality of holes.

4 Claims, 4 Drawing Sheets

METHOD FOR ARRANGING A PLURALITY OF WIRES IN PIPE

BACKGROUND

1. Technical Field

Embodiments of the present disclosure relate to systems and methods for arranging a plurality of wires, and particularly to a method for arranging a plurality of wires in a pipe.

2. Description of Related Art

One method for arranging a plurality of wires in a pipe comprises: fastening a plurality of wires on a lead line in accordance with a plurality of holes of a pipe, inserting the lead line into the pipe, and dragging the lead line through the pipe to arrange the wires. This method can reduce resistance in the pipe; however, length of wires are difficult to be determined before arranging the wires.

DETAILED DESCRIPTION

Figure 2:
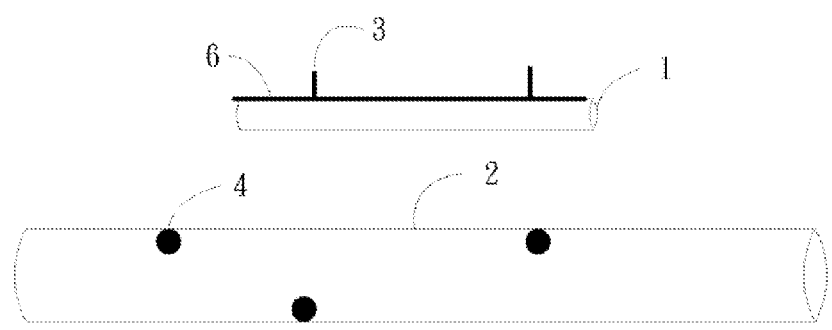
FIG. 2 is a exemplary embodiment illustrating a method for arranging a plurality of wires in a pipe.
Figure 3:
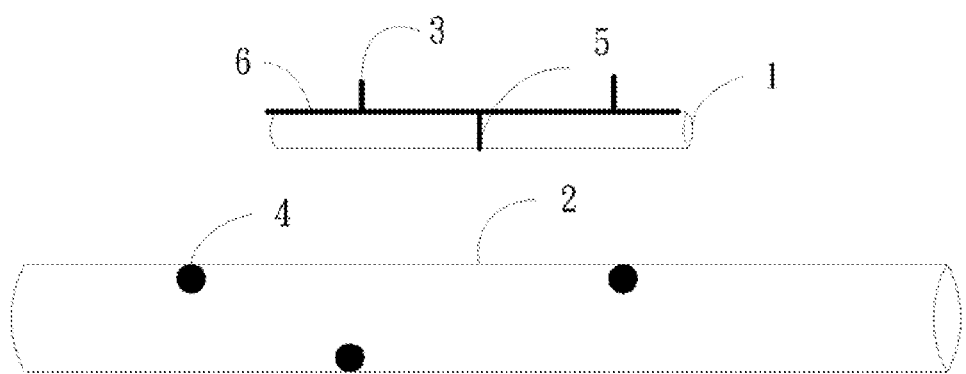
FIG. 3 is a exemplary embodiment illustrating another method for arranging a plurality of wires in a pipe.
Figure 4:
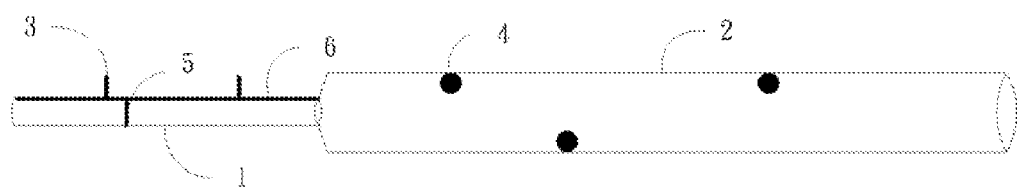
FIG. 4 is a exemplary embodiment illustrating yet another method for arranging a plurality of wires in a pipe.

As shown in FIGS. 2 and 3 and 4, a pipe 2 may be a light pole or a monitor pole, and comprises a plurality of holes 4 located on a surface of the pipe 2.

A lead stick 1 is used to lead a plurality of wires 6 through the pipe 2 to arrange a plurality of wires in the pipe 2.

A fasten tool 5 is used to fasten the plurality of wires 6 onto the surface of the lead stick 1. The fasten tool 5 may be tape or rope.

Each of the plurality of wires 6 may be a communication cable or an electricity power cable, and is used to deliver electricity or communication signals from one equipment to another equipment.

Figure 1:
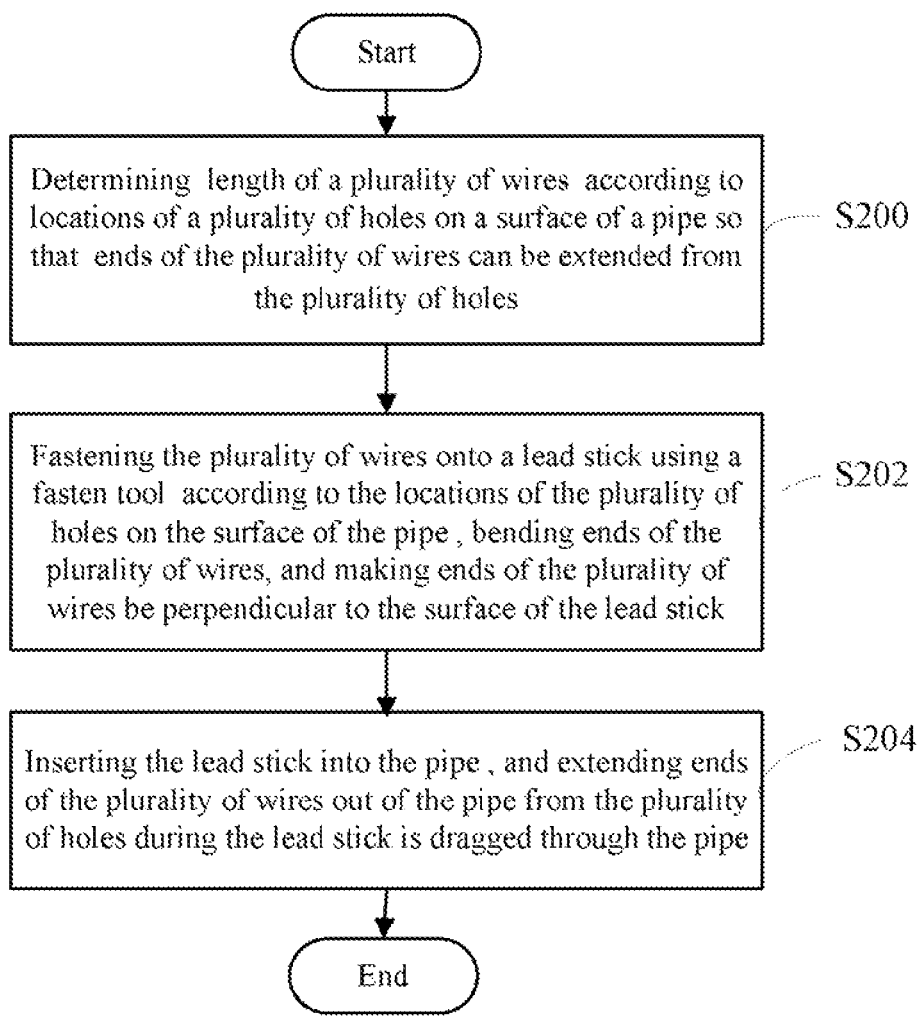
FIG. 1 is a flowchart of one embodiment of a method for arranging a plurality of wires in a pipeline.

FIG. 1 illustrates a flowchart of one embodiment of a method for arranging a plurality of wires in a pipe. Depending on the embodiment, additional steps may be added, others removed, and the ordering of the steps may be changed.

In step S200, length of the plurality of wires 6 is determined according to locations of the plurality of holes 4 on the surface of the pipe 2 so that the ends 3 of the plurality of wires 6 can be extended through the plurality of holes 4.

In step S202, as shown in FIG. 2, the plurality of wires 6 are fastened onto the lead stick 1 according to the locations of the plurality of holes 4 on the surface of the pipe 2, bend ends 3 of the plurality of wires to make ends 3 of the plurality of wires 6 be perpendicular to the surface of the lead stick 1.

In step S204, as shown in FIG. 4, the lead stick 1 is inserted into the pipe 2 and lead through the pipe 2 using the lead stick 1 such that the ends 3 of the plurality of wires 6 extend from the plurality of holes 4.

In one embodiment, a notch may be formed on the surface of the lead stick 1. The plurality of wires 6 can be fastened in the notch, and make the ends 3 of the plurality of the wires 6 be perpendicular to the surface of the lead stick 1.

Although certain inventive embodiments of the present disclosure have been specifically described, the present disclosure is not to be construed as being limited thereto. Various changes or modifications may be made to the present disclosure without departing from the scope and spirit of the present disclosure.

What is claimed is:

1. A method for arranging a plurality of wires in a pipe, the method comprising:
    determining length of the plurality of wires in accordance with locations of a plurality of holes on a surface of the pipe;
    fastening the plurality of wires onto a lead stick using a fasten tool according to the locations of the plurality of holes on the surface of the pipe;
    bending ends of the plurality of wires, and making the ends of the plurality of wires be perpendicular to the surface of the lead stick; and
    inserting the lead stick into the pipeline, and extending the ends of the plurality of wires out of the pipe from the plurality of holes.

2. The method according to claim 1, wherein a notch is on the surface of the lead stick.

3. The method according to claim 2, further comprising:
    fastening the plurality of wires in the notch of the lead stick; and
    bending the ends of the plurality of wires, and making the ends of the plurality of wires be perpendicular to the surface of the lead stick.

4. The method according to claim 1, wherein the fasten tool is tape or rope.

* * * * *